Patented Sept. 9, 1947

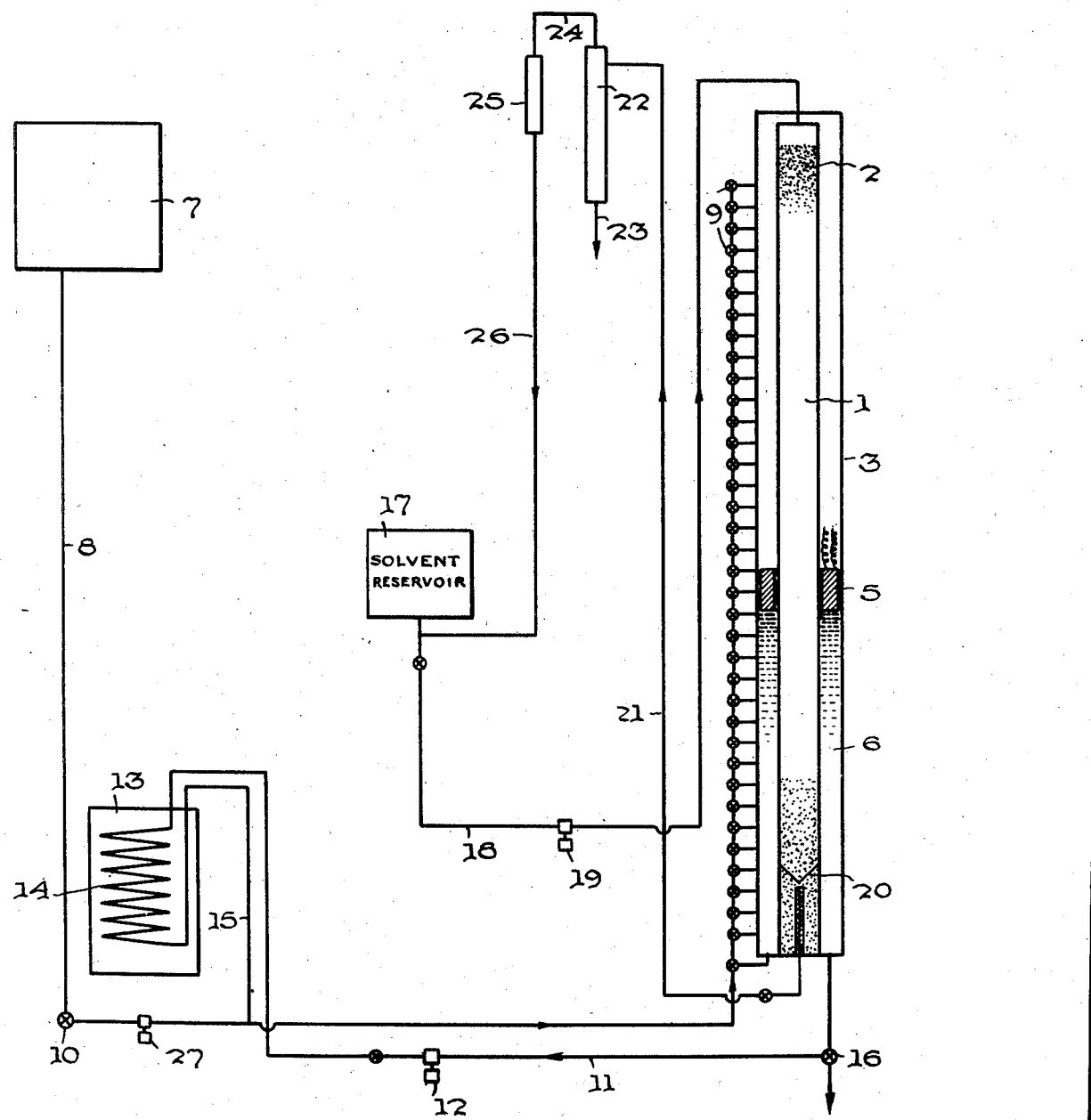

2,427,042

UNITED STATES PATENT OFFICE 2,427,042

METHOD AND APPARATUS FOR SEPARATING MIXTURES

John R. Bowman, Pittsburgh, Pa., assignor to Gulf Research & Development Company, Pittsburgh, Pa., a corporation of Delaware Application April 3, 1946, Serial No. 659,413

10 Claims. (Cl. 196—18)

1

This invention relates to a method and apparatus for separating mixtures; and, more particularly, to a method and apparatus for separating homogeneous mixtures of solids into their component parts by stratifying the components.

The separation of homogeneous mixtures of solids has been accomplished in various ways, depending upon the properties of the particular mixtures to be separated. These methods include distillation, extraction, absorption, adsorption, fractional recrystallization, etc. It is sometimes possible, by altering temperature or pressure, to separate mixtures by means not applicable to separating the mixture at room temperature and atmospheric pressure. For example, mixtures of normally solid materials may sometimes be separated by distillation, if the solids are first fused.

The present invention is concerned with homogeneous mixtures of solids. As used herein, the term solid will include not only materials which are solid at room temperature but those which become solid at temperatures as low as it is practicable to obtain in the apparatus.

In certain applications, prior art separation methods are inadequate. For example, in the case of the separation of the components of paraffin wax, which is a mixture of a large number of hydrocarbons, prior art methods have been laborious and unsatisfactory.

One of the objects achieved by the present invention is to provide a process and apparatus for separating homogeneous mixtures of solids difficult to separate by ordinary means.

Another of the objects achieved by the present invention is to provide a process and apparatus for separating homogeneous mixtures of solids by recrystallization or resolidification.

The present invention relates to a process for the separation of homogeneous mixtures of solids which comprises first converting the solids into fluids and passing the fluids through a bed of space-filling filtering material. The filter bed is initially subjected to a temperature distribution or spread decreasing in the direction of flow of the fluid and beginning at the inlet end of the filter bed. Subsequently this temperature distribution is caused to move in the direction of flow toward the outlet end of the bed, and successive fractions of the introduced mixture of solids are removed.

The temperature distribution will be a temperature range of, for example, +20° F. to −65° F. over a definite length of the bed such as, for example, 40 inches. This temperature distribution

2 is caused to move in the direction of flow, for example, by heating the upper end of the filter bed and cooling the lower end so that the +20° F. temperature moves gradually in the direction of flow and continues to be spaced from the −65° F. temperature by 40 inches. The temperature distribution extends from a temperature at least high enough to convert the solids to fluids to a temperature at least low enough to re-convert the fluids to solids.

The mixture may be carried through the bed of filtering material by gravity, or a solvent may be used and the mixture dissolved in and recrystallized from the solvent. In this case the separation depends upon the solubility of the various components of the mixture in the solvent. If no solvent is used, the mixture may be melted and resolidified. In this case the degree of separation depends upon the proximity of the freezing points of the various components in the mixture.

The preferred apparatus comprises a vertical column packed with a space-filling filter medium, such as sand, with means for establishing a vertical temperature distribution in the filter medium. This means for establishing a temperature distribution in the filter medium may be a heating element surrounding the packed column, so arranged that the heating element may be lowered down the length of the column. The temperature distribution may require a cooling element provided at a desired distance from, or adjacent to, the heating element. For example, an electric heating element surrounding the column may rest on a float upon a body of liquid coolant also surrounding the packed column and the liquid coolant may be withdrawn gradually, thus lowering the heating coil.

A specific embodiment of the invention is illustrated in the drawing in which there is shown a vertical column 1 packed with a filter medium 2, such as sand. A cylindrical jacket 3 is concentrically arranged about column 1. In the space between jacket 3 and the wall of column 1 there is a movable heating element 5 which floats upon a body of liquid coolant 6. The coolant is pumped by pump 27 from a reservoir 7 through conduit 8 to a long manifold of valves 9. The valves are adapted to be manually controlled so that only one permits entry of coolant into the jacket at any one time, and that one is the one just below the electric heating element. The position of the heating element may be determined by the use of a sight glass, not shown, to indicate the level of the coolant upon which the heating element is floating. The liquid coolant leaves the cooling jacket by means of conduit 11 and may be circulated by pump 12 to a heat exchanger 13. The coolant passes through coils 14 in the heat exchanger 13, which in this instance is packed with dry ice, so that the liquid coolant has its temperature lowered. The liquid coolant passes from coils 14 by means of conduit 15 to conduit 8 where it is returned to the column. Valve 10 is provided to cut off the supply of coolant after the column jacket 3 is first filled and valve 16 is provided to bleed off the coolant to lower the heating element. The coolant system may also include an alkalizer, not shown, to remove any acid formed in the decomposition of such a coolant as trichlorethylene. The column 1 is equipped at the top thereof with any conventional means, not shown, for introducing the mixture of solids to be separated.

In the apparatus illustrated, there is a solvent circulatory system. There is provided a solvent reservoir 17 from which the solvent passes by means of conduit 18 and pump 19 into the top of the column 1. Solvent containing a separated portion of the mixture is collected by funnel 20 in column 1 and passes by conduit 21 to a continuous stripper still 22, from which the desired fractions are removed in turn through conduit 23 and the solvent overhead is passed by conduit 24 to a condenser 25 wherein it is condensed and returned to solvent reservoir by conduit 26. Also, the lower end of column 1 may contain a funnel 20 for collecting solvent, the constricted portion of which may be heated to prevent deposition of solids and hence avoid plugging up.

In one example of an apparatus of the invention, a small unit for laboratory purposes, column 1 had a 6-inch diameter and was 10 feet high. It was packed with 40 to 60 mesh Ottawa sand and enclosed in a concentric jacket 14.5 inches in diameter.

One application of the apparatus is the separation of paraffin wax into close-cut fractions of nearly pure hydrocarbons. In one method for doing this, pentane was used as the solvent for a refined paraffin wax of 135° F. American melting point. Trichlorethylene was used as the liquid coolant, and its temperature was controlled by passing it through a Dry Ice heat exchanger. The trichlorethylene at the beginning of the operation substantially filled jacket 3 and was slowly bled off, so that its level was continuously lowered over the period of the run. The electric heater which floated on top of the trichlorethylene was consequently also lowered. The unit was started by filling the sand packed column with pentane to the level of the top of the sand. A quantity of wax was introduced into the column above the sand and the heater turned on to give the sand in the neighborhood of the heater a temperature of about 20° F., the trichlorethylene being maintained at a temperature of about —65° F. Circulation of the pentane was started and the wax which dissolved in the pentane began to pass down the column in solution. The wax was precipitated from solution on the sand as the solution flowed into a colder region. As the temperature was raised in that region by the lowering of the heater, the solid wax was redissolved, flowed downward, and reprecipitated in the same manner at a lower point in the column. Each time the wax was deposited, however, it was deposited non-uniformly, depending upon the solubility-temperature relationship in the solvent for each of the components of the wax; the more soluble components of the wax were deposited lower in the column, i. e., at a lower temperature, than the less soluble ones. As the coolant level and the heater continued to lower, the redissolve-reprecipitate cycle repeated an indefinite number of times, increasing the non-uniformity of the composition distribution. The separation became more and more distinct as the process continued. When the solvent coming out at the bottom of the column contained some portions of wax, the solution was passed to the stripper still where the solvent was separated from the wax components, the wax components being taken off in succession from the bottom of the still. These components had the characteristics shown in the table below.

Table I

| Frac. No. | Per cent by wt. Charge | Cumulative, Per cent by wt. | Molecular Weight | Melting Point |
|---|---|---|---|---|
| | | | | ° F. |
| 1 and 2 | 0.85 | 0.85 | | 50 |
| 3 | 1.42 | 2.27 | 285 | 96.1 |
| 4 | 1.57 | 3.84 | 294 | 107.1 |
| 5 | 2.53 | 6.37 | 299 | 106.7 |
| 6 | 5.75 | 12.12 | 312 | 114.4 |
| 7 | 4.10 | 16.22 | 319 | 116.1 |
| 8 | 4.41 | 20.63 | 325 | 117.9 |
| 9 | 4.21 | 24.84 | 329 | 119.3 |
| 10 | 5.01 | 29.85 | 335 | 123.8 |
| 11 | 4.13 | 33.98 | 344 | 127.4 |
| 12 | 5.41 | 39.39 | 352 | 129.7 |
| 13 | 4.43 | 43.82 | 355 | 130.8 |
| 14 | 3.73 | 47.55 | 355 | 131.9 |
| 15 | 4.00 | 51.55 | 353 | 131.9 |
| 16 | 2.82 | 54.37 | 358 | 132.3 |
| 17 | 4.26 | 58.63 | 365 | 135.1 |
| 18 | 2.73 | 61.36 | 371 | 136.9 |
| 19 | 4.21 | 65.57 | 377 | 138.9 |
| 20 | 3.33 | 68.90 | 382 | 140.5 |
| 21 | 4.26 | 73.16 | 389 | 142.7 |
| 22 | 4.81 | 77.97 | 404 | 144.1 |
| 23 | 3.44 | 81.41 | 409 | 145.0 |
| 24 | 3.36 | 84.77 | 412 | 145.6 |
| 25 | 5.63 | 90.40 | 416 | 146.1 |
| 26 | 4.18 | 94.58 | 417 | 146.1 |
| 27 | 3.33 | 97.91 | 418 | 146.3 |
| 28 | 2.11 | 100.0 | 417 | 146.3 |

While the process and apparatus have been illustrated as applied to the separation of the components of paraffin waxes, they are adaptable to a wide variety of other uses. For example, they may be used in the separation of rare earth salts which are closely similar in solubility and other properties, the separation of which has usually been carried out by fractional crystallization. Another example is the concentration of radium salts from pitch-blende or other radium containing ores. Still another example is the production of pure fatty acids from commercial or technical grade products. Thus, in general, the apparatus and process relate to the separation of homogeneous mixtures of solid materials or materials which are capable of becoming solid within the particular operating temperatures of the apparatus, and is particularly adaptable to those separations difficult or impossible by the use of known methods.

The efficiency of the process is dependent upon a number of variables. Primarily, these include the magnitude of the temperature distribution, the rate of travel downward of the temperature distribution zone, the rate of flow of the solvent if one is used, and the type of packing used.

In the illustration of the application of the invention to the separation of paraffin wax, the range of temperature extremes is given as from +20° F. to —65° F. This temperature range may be varied by using different cooling means or a different amount of heat, and such a temperature range should be adjusted to the materials being separated. The efficiency is increased as the number of reprecipitations is increased, and this may be achieved by shortening the working zone, or reducing the rate at which it moves down the column.

The filtering material should hold the solid precipitate at its place of formation against the motion of the fluid stream until it is redissolved or remelted. Further it should allow the flow of solution or melted material in a manner which prevents plugging up the apparatus. The theoretically perfect packing is, of course, not obtainable, but in separations of paraffin wax a good grade of sand has been found sufficiently effective.

For a given temperature gradient, the ratio of linear solvent flow to distribution travel rate (that is, the rate at which the coolant level is lowered) should be adjusted to prevent plugging and to secure the highest possible efficiency. In the separation of paraffin, it has been found that for a temperature gradient of 1° F. per inch, the ratio of solvent linear velocity to temperature distribution travel rate should preferably be kept above 5 to 1. The preferable rate for temperature distribution travel was found to be about ¼ inch per hour for the separation of paraffin wax, using sand as packing.

An alternative method of causing the temperature distribution to travel along the column other than by the mechanical means illustrated is to provide a column which is very cool at one end, preferably the lower end, and warm enough at the other end to melt or dissolve the mixture. The entire column may be then gradually heated causing the useful temperature distribution range to move toward the colder end of the column. For example, if a given mixture melts at 100° F. and a temperature gradient of 1° F. per inch for 10 inches of the column is required to effectively separate the mixture, the lower end of the column may be initially cooled to a temperature very much lower than necessary to reconvert the fluids to solids, say 0° F. for a 100-inch column. If the mixture requires 10 inches and a 10° temperature drop to resolidify, then only the top 10 inches of the column would be used for the first solidification. However, if the entire column is gradually heated uniformly throughout its length, the point in the column where the temperature is 100° F. will gradually be lowered until it reaches the bottom of the column, at which time the whole mixture will have passed through the column.

To convert the mixture of solids to a fluid may be done in any one of several ways. For example, as illustrated in the case of the paraffin separation, the mixture may be dissolved in a solvent. Alternatively it is sometimes possible to melt the solids into liquids, or it is possible in the case of some solids to transform them into vapors or gases directly as in the case of a sublimed material.

Various adaptations of the process will be apparent to those skilled in the art. For example, the process may utilize various heat exchange methods and devices such as the use of finned tubes. Also it may be desirable in certain types of filter beds to provide an agitator to break up all agglomerates of solids which might form. These and other adaptations of the invention to particular problems will be obvious to those skilled in the art.

What I claim is:

1. A process for the separation of homogeneous mixtures of solids which comprises converting said solids into fluids and passing said fluids through a bed of space-filling filtering material, subjecting the bed to a temperature distribution decreasing in the direction of flow and beginning at the inlet end of the bed, and subsequently causing this temperature distribution to move in the direction of flow toward the outlet end of the bed and recovering successive fractions of the introduced mixture of solids, said temperature distribution extending from a temperature at least high enough to convert the solids to fluids to a temperature at least low enough to reconvert the fluids to solids.

2. A process for the separation of homogeneous mixtures of solids which comprises melting said solids and passing said melted material through a bed of space-filling filtering material, subjecting the bed to a temperature distribution decreasing in the direction of flow and beginning at the inlet end of the bed, and subsequently causing this temperature distribution to move in the direction of flow toward the outlet end of the bed and recovering successive fractions of the introduced mixture of solids, said temperature distribution extending from a temperature at least high enough to melt the solids to a temperature at least low enough to resolidify the solids.

3. A process for the separation of homogeneous mixtures of solids which comprises vaporizing said solids and passing said vaporized material through a bed of space-filling filtering material, subjecting the bed to a temperature distribution decreasing in the direction of flow and beginning at the inlet end of the bed, and subsequently causing this temperature distribution to move in the direction of flow toward the outlet end of the bed and recovering successive fractions of the introduced mixture of solids, said temperature distribution extending from a temperature at least high enough to vaporize the solids to a temperature at least low enough to resolidify the solids.

4. A process for the separation of homogeneous mixtures of solids which comprises dissolving said solids and passing the resulting solution through a bed of space-filling filtering material, subjecting the bed to a temperature distribution decreasing in the direction of flow and beginning at the inlet end of the bed, and subsequently causing this temperature distribution to move in the direction of flow toward the outlet end of the bed and recovering successive fractions of the introduced mixture of solids, said temperature distribution extending from a temperature at least high enough to dissolve the solids to a temperature at least low enough to resolidify substantially all of the solids.

5. A process for the separation of paraffin wax into fractions respectively enriched with regard to individual hydrocarbon components of the wax which comprises dissolving said paraffin wax and passing the resultant solution through a column packed with sand, subjecting the bed to a temperature distribution of from about +20° F. to about −65° F. decreasing in the direction of flow and beginning at the inlet end of the bed, and subsequently causing this temperature distribution to move down the column, while continuously adding solvent at the top of the column, so that the paraffin wax alternately dissolves and reprecipitates out of solution, and distilling fractions of the solution withdrawn from the column to obtain said component hydrocarbons.

6. A process for the separation of homogeneous mixtures of solids which comprises converting said solids into fluids and passing said fluids through a bed of space-filling filtering material subjecting the bed to a temperature distribution decreasing in the direction of flow and beginning at the inlet end of the bed, and subsequently causing this temperature distribution to move in the direction of flow toward the outlet end of the bed by means of the movement of a heating unit along the filtering bed preceded by a body of coolant and recovering successive fractions of the introduced mixture of solids, said temperature distribution extending from a temperature at least high enough to convert the solids to fluids to a temperature at least low enough to reconvert the fluids to solids.

7. A process for the separation of homogeneous mixtures of solids which comprises converting said solids into fluids and passing said fluids through a bed of space-filling filtering material, subjecting the bed to a temperature distribution decreasing in the direction of flow and beginning at the inlet end of the bed, and subsequently causing this temperature distribution to move in the direction of flow toward the outlet end of the bed and recovering successive fractions of the introduced mixture of solids, said temperature distribution extending from a temperature at least high enough to convert the solids to fluids to a temperature at least low enough to reconvert the fluids to solids, said temperature distribution being caused to move by gradually heating the entire bed of filtering material which was initially cooled at one end to a temperature very much lower than necessary to reconvert the fluids to solids.

8. An apparatus for separating mixtures of solids comprising a vertical column packed with a space-filling filter medium, a surrounding concentric jacket containing a liquid coolant, heating means in said concentric jacket arranged above said liquid coolant, and means for gradually lowering the level of said liquid coolant and said heating means.

9. An apparatus for separating mixtures of solids comprising a vertical column packed with a space-filling filter medium, a surrounding concentric jacket containing a liquid coolant, heating means in said concentric jacket adapted to float upon said liquid coolant, a series of valves along the length of said concentric jacket adapted to admit liquid coolant at predetermined levels, means for withdrawing said liquid coolant near the bottom of said concentric jacket and means for removing heat from said liquid coolant.

10. An apparatus for separating mixtures of solids comprising a vertical column packed with a space-filling filter medium, a surrounding concentric jacket containing a liquid coolant, heating means in said concentric jacket adapted to float upon said liquid coolant, a series of valves along the length of said concentric jacket adapted to admit liquid coolant at predetermined levels, means for withdrawing said liquid coolant near the bottom of said concentric jacket and means for removing heat from said liquid coolant, means for introducing a mixture of solids at the upper end of said vertical column, means for introducing a solvent at the upper end of said vertical column, means for withdrawing a solution of solids at the lower end of said vertical column, means for distilling said solution and means for returning said solvent from said solution to said vertical column.

JOHN R. BOWMAN.

REFERENCES CITED

The following references are of record in the file of this patent:

UNITED STATES PATENTS

| Number | Name | Date |
| --- | --- | --- |
| 1,278,023 | Rosenbaum | Sept. 3, 1918 |
| 2,200,982 | Deadlow | May 14, 1940 |
| 2,214,976 | Stockbarger | Sept. 17, 1940 |
| 2,287,966 | Brandt | June 30, 1942 |
| 2,361,035 | Klaasen | Oct. 24, 1944 |

FOREIGN PATENTS

| Number | Country | Date |
| --- | --- | --- |
| 434,579 | Great Britain | Sept. 4, 1935 |

OTHER REFERENCES

Petroleum Refiner, vol. 22, No. 5, May 1943, pages 98–102 (article by Turner).